United States Patent [19]
Welch et al.

[11] Patent Number: 6,044,881
[45] Date of Patent: Apr. 4, 2000

[54] PROTECTIVE HAIL COVER FOR VEHICLES

[76] Inventors: Robert E. Welch, 1925 Schumac, Bedford, Tex. 76022; Ronald S. Welch, 7824 Amy La., North Richland Hills, Tex. 76180

[21] Appl. No.: 09/181,630

[22] Filed: Oct. 28, 1998

[51] Int. Cl.[7] .................................................. B65D 65/02
[52] U.S. Cl. ........................... 150/166; 296/136; 206/582
[58] Field of Search .................................. 150/166, 154; 296/136; 206/522; 383/3; 5/710, 706, 655.3

[56] References Cited

U.S. PATENT DOCUMENTS

| | | | |
|---|---|---|---|
| 889,756 | 6/1908 | Bukacek | 5/655.3 X |
| 1,361,453 | 12/1920 | Frey | 5/655.3 |
| 1,733,034 | 10/1929 | Tufenkjian | 5/655.3 |
| 4,294,483 | 10/1981 | Ferris . | |
| 5,242,206 | 9/1993 | Heck . | |
| 5,287,904 | 2/1994 | Smith et al. . | |
| 5,350,000 | 9/1994 | Wang . | |
| 5,518,289 | 5/1996 | Cobble | 296/136 |
| 5,664,825 | 9/1997 | Henke et al. | 296/136 |
| 5,902,003 | 5/1999 | Hindson | 296/136 |
| 5,918,336 | 6/1999 | Lee et al. | 5/710 X |

FOREIGN PATENT DOCUMENTS 002747603   4/1979   Germany ............................... 196/136

*Primary Examiner*—Gary E. Elkins
*Assistant Examiner*—Tri M. Mai
*Attorney, Agent, or Firm*—Geoffrey A. Mantooth

[57] ABSTRACT

The cover protects a vehicle from damage by weather. The cover has a flexible shell that is located over the surface of the vehicle. The shell is spaced from the surface by at least one inflatable tube. The inflatable tube is coupled to the underside of the shell by way of an attachment tube. The attachment tube is coupled to the underside of the shell by way of one or more flaps. The attachment tube has an interior cavity that receives the inflatable tube therein. The attachment tube has plural lengths, with each length extending adjacent to at least one other length. The lengths are separated from each other by gaps so as to space apart the attachment tubes and minimize the weight of the cover. A single attachment tube and a single inflatable tube can be used, wherein the tubes are laid out on the shell in a spiral or a zig zag pattern.

7 Claims, 6 Drawing Sheets

6,044,881

PROTECTIVE HAIL COVER FOR VEHICLES

FIELD OF THE INVENTION

The present invention relates to protective covers for vehicles against hail and other things.

BACKGROUND OF THE INVENTION

In some parts of the United States, hail storms occur quite frequently. For example, in Texas and Oklahoma, spring is a particularly bad time of year. Violent thunderstorms form, dropping hail stones ranging from pea to grapefruit size.

Hail stones striking vehicles such as automobiles are particularly destructive. The stones dent or fracture the metal or plastic on roofs, hoods and trunks. Likewise, the glass windshields are easily cracked.

Consequently, the vehicle damage caused by hail is immense.

Ideally, when a hail storm lits an area, vehicles should be parked under some building structure, such as a home garage or a commercial parking garage. Unfortunately, such protections are not readily available for many vehicle owners. Because vehicles are necessarily left exposed to the full brunt of a storm, other approaches must be taken.

In the prior art, there are protective covers for vehicles. Many of these covers are inflatable with air or some other type of gas. These prior art covers are heavy and difficult to place on a vehicle.

In fact, these prior art protective covers are so unsatisfactory, I have not seen any offered commercially.

SUMMARY OF THE INVENTION

It is an object of the present invention to provide a cover for vehicles that offers protection from hail.

It is another object of the present invention to provide a protective cover for vehicles that is economical to make.

It is a further object of the present invention to provide a protective cover that is relatively easy to install on a vehicle.

It is a further object of the present invention to provide a protective cover that is easy to stow.

The present invention provides a protective cover for a vehicle. The cover includes a flexible shell having two sides. There is an attachment tube that is coupled to one of the sides of the shell. The attachment tube has an interior cavity therein. There is also an inflatable tube that is located in the interior cavity of the attachment tube.

In accordance with one aspect of the present invention, the attachment tube has plural lengths. Each length of the attachment tube extends adjacent to at least one other length of the attachment tube. The adjacent lengths of the attachment tube are separate from each other by a gap.

In accordance with another aspect of the present invention, the attachment tube has a diameter with the gap being greater than one half of the diameter.

In accordance with still another aspect of the present invention, the plural lengths of the attachment tube are joined together to form a single attachment tube.

In accordance with still another aspect of the present invention, the plural lengths of the attachment tube are arranged in a spiral on the shell.

In accordance with still another aspect of the present invention, the attachment tube comprises a sheet having two opposite edge portions, the edge portions forming flaps, which flaps are coupled to the shell so as to form the attachment tube. Alternatively, the attachment tube comprises a sheet having two opposite edge portions, the edge portions overlapping each other so as to form the attachment tube, with an outer edge portion being coupled to the shell.

The present invention also provides a cover for protecting a vehicle, which vehicle has a surface that can be damaged if exposed to weather. The cover has a flexible shell located over the surface of the vehicle. The shell is spaced from the surface by an inflatable tube. The inflatable tube is coupled to the shell by way of an attachment tube. The attachment tube is coupled to the shell and has an interior cavity that receives the inflatable tube. The attachment tube bears on the surface of the vehicle.

DESCRIPTION OF THE PREFERRED EMBODIMENT

Figure 1:
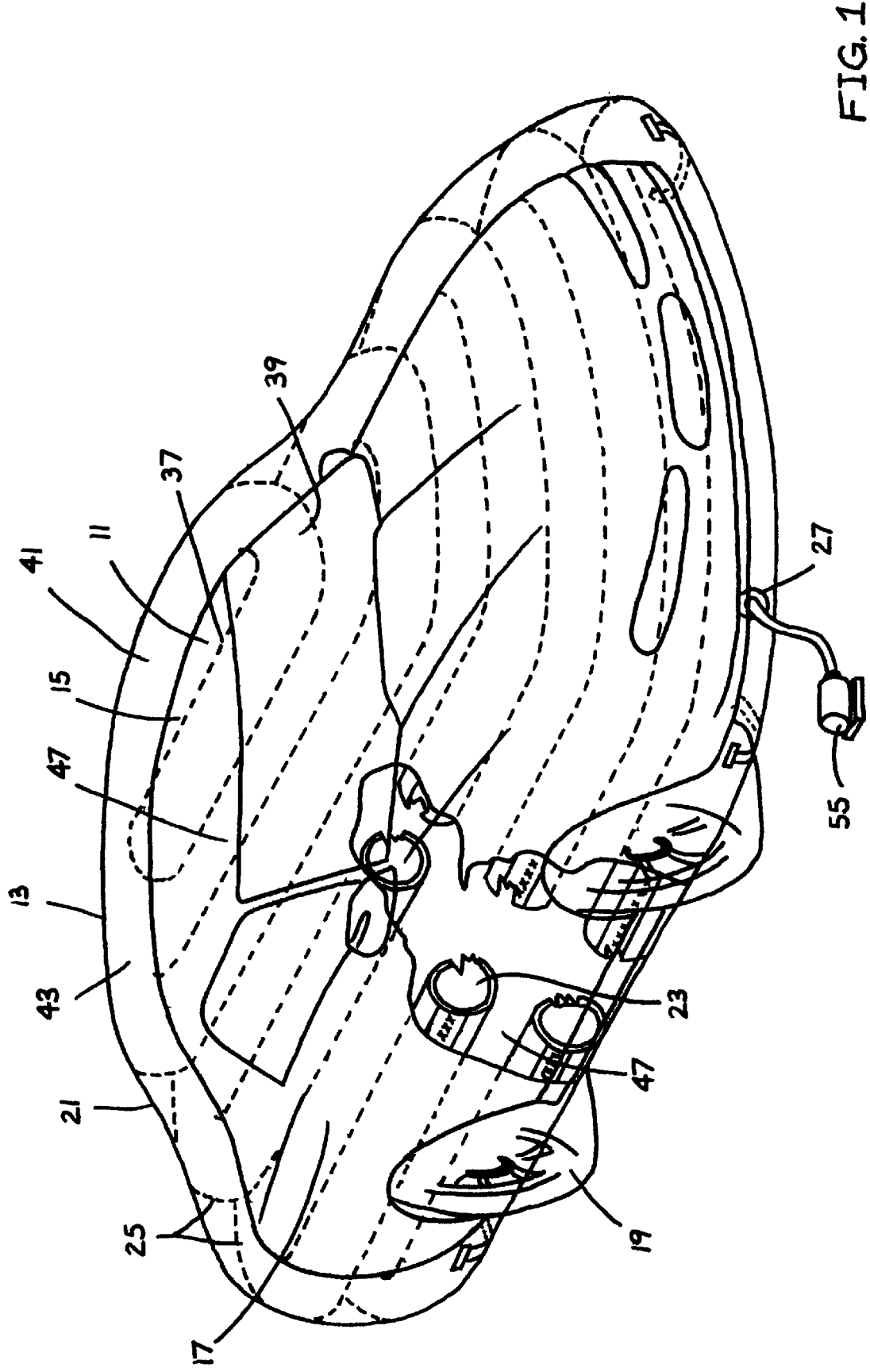
FIG. 1 is an isometric view of a passenger vehicle shown covered with a protective cover of the present invention, in accordance with a preferred embodiment. For illustration purposes, the vehicle can be seen through the cover.

In FIG. 1, there is shown an isometric view of a vehicle 11, protected from the elements by the protective cover 13. For purposes of illustration, in FIGS. 1 and 4, the cover is transparent to permit the vehicle to be seen therethrough. In this manner, the relationship between the cover and the vehicle can be easily seen. Typically, however, the cover is opaque.

The cover 13 covers the top surfaces 15 (for example glass, metal or plastic) as well as the side surfaces 17 of the vehicle 11. Portions of the tires 19 are left exposed, because the tires are less likely to be damaged. The cover 13 can be used either inflated or uninflated.

With the vehicle 11 so covered, any weather elements are not likely to inflict damage thereon. For example, hail stones dropping down to earth will strike the cover 13. As will be explained in more detail herein, the inflated cover 13 cushions the impact of the hail stones and in most cases prevents the hail stones from ever impacting the vehicle. Likewise, when the vehicle 11 is covered with the cover (whether inflated or uninflated) the vehicle is protected from sunlight, dust, wind driven debris, etc.

Figure 2:
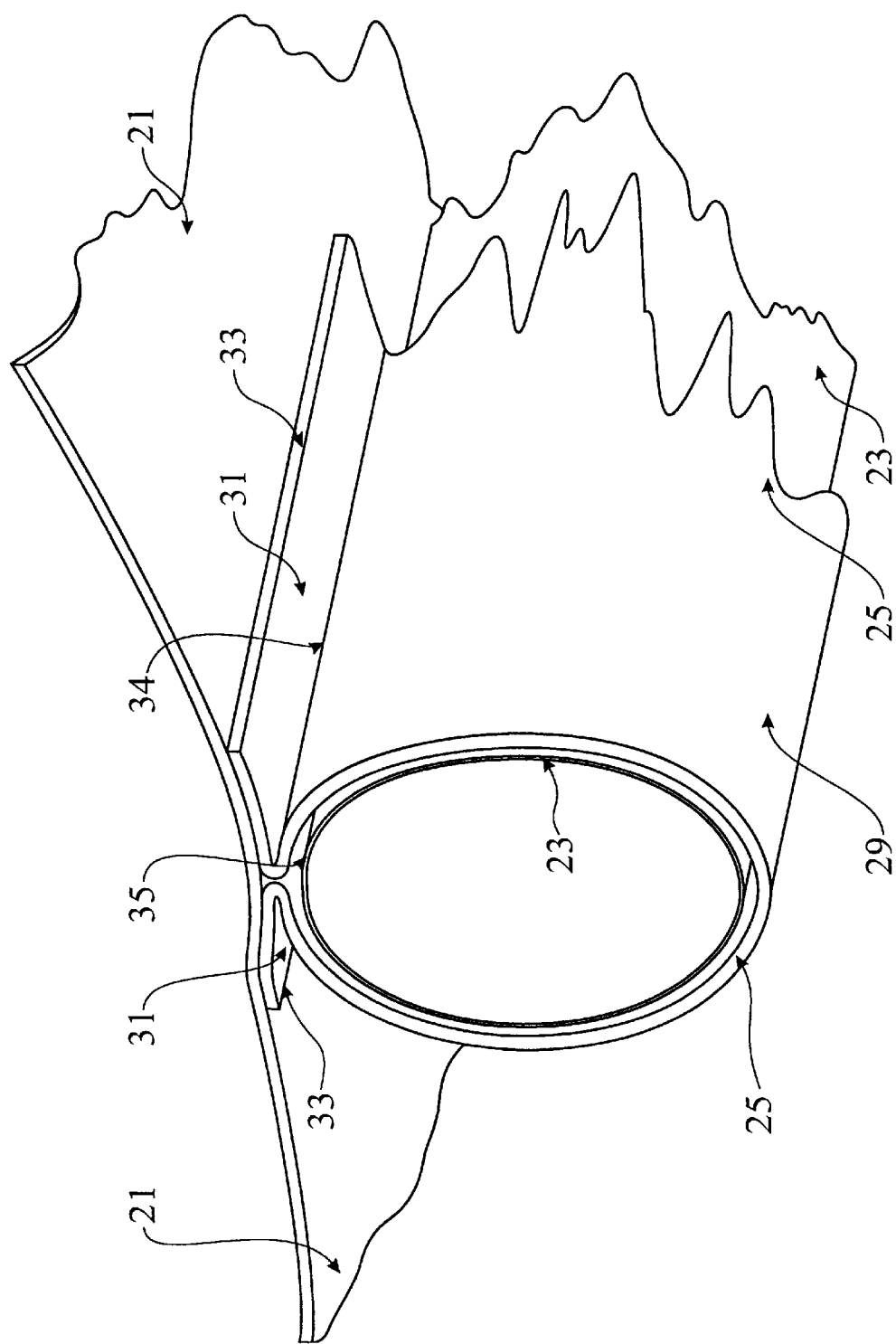
FIG. 2 is a close up isometric view of an inflatable tube, attached to a shell of the cover in accordance with a first embodiment.

Referring now to FIG. 2, the cover 13 will be described in more detail. The cover 13 comprises a flexible shell 21. The shell 21 is typically made of canvas, although it can be made from a variety of materials, such as polyester, propylene, acrylics, nylons (which are lighter in weight than canvas), etc. The shell should be resistant to ultraviolet light and be tear resistant as well. Vehicle shells (or covers as they are commercially known) are conventional and commercially available and are commonly used to protect a vehicle from sunlight and dust. However, a conventional shell alone will not protect the vehicle from hail stones. This is because the shell is in physical contact with the vehicle surfaces. Therefore, an impacting hail stone hits the vehicle through the shell.

The cover of the present invention can modify or retrofit an existing shell. Ideally, the shell used in the present invention is big enough to allow at least several inches of spacing between the cover and the vehicle surfaces. In a more conventional arrangement, the shell is tight fitting around the vehicle to prevent it from shifting or flapping.

Located between the shell 21 and the vehicle 11 is an inflatable tube 23. The inflatable tube 23 can be made from an airtight polyethylene. In the preferred embodiment, the diameter of the inflatable tube is six to twelve inches. Thus, the shell 21 is spaced from vehicle 11 a distance that is in proportion to its diameter.

The inflatable tube 23 is attached to the shell 21 by way of an attachment tube 25. The attachment tube 25 can be canvas or made of other material. Because the attachment tube is not exposed to the weather (being on the underside of the shell 21), it can be lighter in weight than the shell itself. The inflation tube 23 is provided with a valve 27 (see FIG. 1) to permit the inflation and deflation thereof. The valve 27 penetrates the attachment tube and the shell for ease of access. In addition, a pressure relief valve (not shown) may be provided.

The attachment tube 25 is a wide strip 29 of material. The material is sized so as to fit around the circumference of the inflatable tube and still have at least one flap 31 for attachment to the shell 21. In FIG. 2, one attachment arrangement of the attachment tube to the shell is shown. The strip 29 has edges 33.

To make the attachment tube 25, a casing is made from the strip 29. The two edge portions of the strip are stitched together along a seam 34 a short distance from the actual edges 33. The stitching is along the entire length of the strip 29. This forms the flaps 31 and the casing with its interior cavity 35. The flaps 31 are then coupled to one side of the shell 29 by stitching, adhesive, etc.

The attachment tube 25 forms an interior cavity 35 that receives the inflatable tube 23. The deflated inflatable tube 23 is inserted into the interior cavity 35 of the attachment tube 25. For example, if the attachment tube is sixty feet long, then sixty feet of inflation tube is inserted therein.

The attachment tube 25 can extend across the shell 21 in a variety of patterns in order to support the entire shell off of the vehicle. For instance, in FIG. 1, a single attachment tube 25 is utilized. The attachment tube is laid out in a spiral or a coil. A first length 37 of the attachment tube is attached to the center of the shell and extends longitudinally toward the front end of the vehicle. It then forms a U turn 39 and a second length 41 extends toward the rear end of the vehicle, where it forms a wider U turn 43 and a third length 45 extends toward the front end of the vehicle, and so on.

The various lengths of the attachment tube 25 need not touch each other and in fact it is preferable if a gap 47 is maintained therebetween. The gap 47 reduces the amount of the inflatable tube 23 that is needed and therefore reduces the overall weight of the apparatus. In the preferred embodiment, the diameter of the inflatable tube 23 is ten inches and the gap between adjacent portions of the inflatable tube is about one foot. Thus, there is about one foot between the first and second lengths 37, 41 and between the first and third lengths 37, 45. In addition, there is about one foot between the rear end of the first length 37 and the U turn 43 that joins the second and third lengths 41, 45 together. There is also about one foot between the respective U turns.

The attachment tube 25 extends from the top 15 of the vehicle, along the windows, hood, trunk, and along the sides 17 to fully support the shell off of the vehicle when the inflatable tube is inflated.

Figure 4:
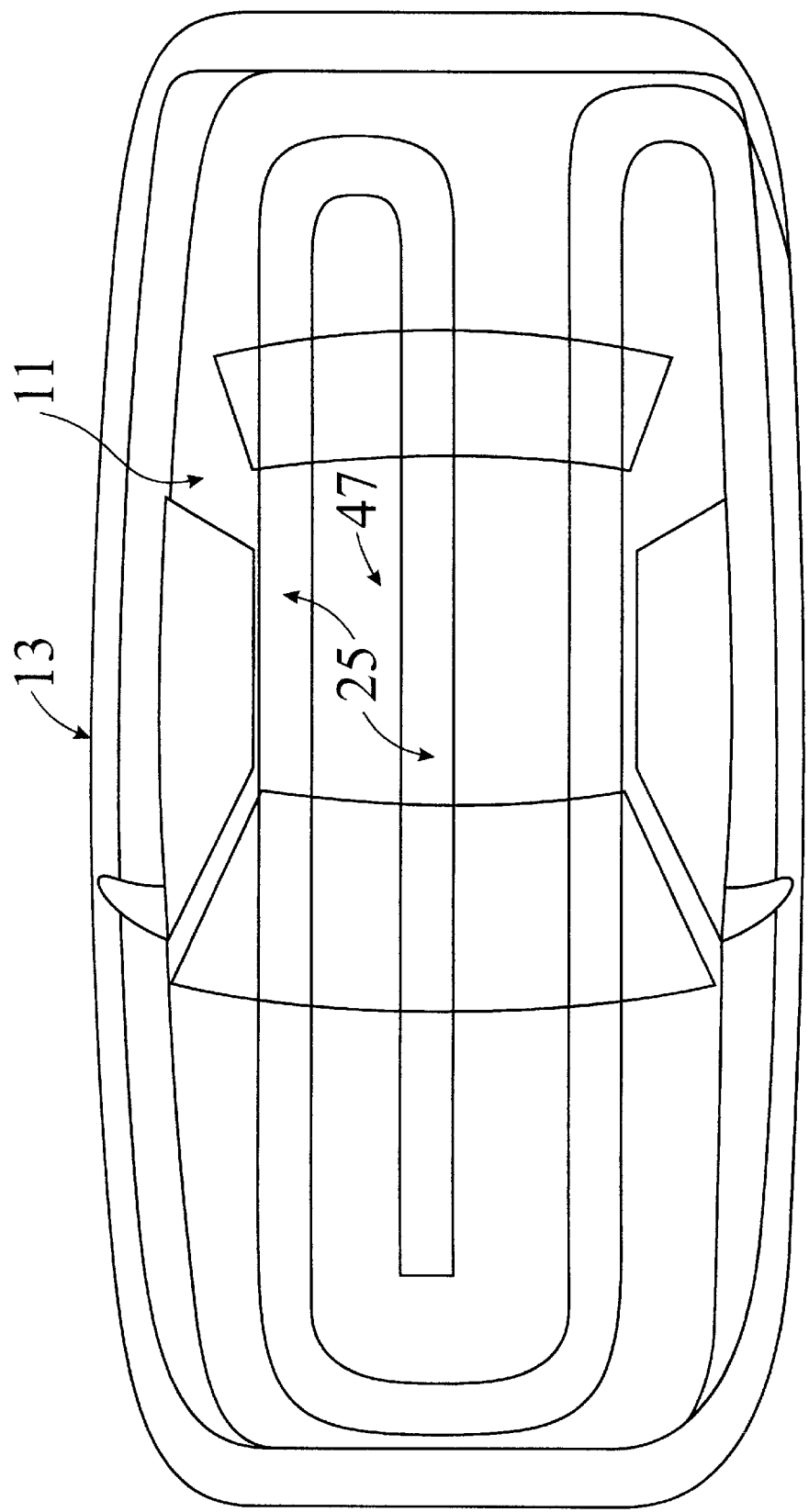
FIG. 4 is a plan view of the vehicle of FIG. 1, shown with the cover. For illustration purposes, the vehicle can be seen through the cover.

Another attachment to pattern is shown in FIG. 4. In FIG. 4, a true spiral is not formed. Instead, the attachment tube 25 zig zags over the vehicle.

Still another attachment tube pattern involves the use of plural inflatable tubes and attachment tubes. For example, the inflatable tubes 23 could extend parallel to each other and longitudinally from the front to the rear of the vehicle. Alternatively, the inflatable tubes could extend parallel to each other and transversely from side to side across the vehicle. Each inflatable tube could be provided with an inflate/deflate valve, or the inflatable tubes could be connected together by small tubes.

To make the cover 13, the shell 21 is laid on a surface, such as a table or floor, with the inside of the shell facing up. Then, beginning with one end of the attachment tube 25, the flaps 31 are coupled to the shell 21. The attachment tube 25 is laid down on the shell 21 in a manner corresponding to the desired pattern and then coupled to the shell. After the attachment tube has been coupled to the shell, the inflatable member 23 is inserted into the interior cavity for the entire length of the attachment tube. The ends of the attachment tube need not be closed after the installation of the inflatable tube. Alternatively, the inflatable tube can already be installed in the attachment tube. In this case, the attachment tube is already formed into a tube before it is attached to the shell.

Figure 3:
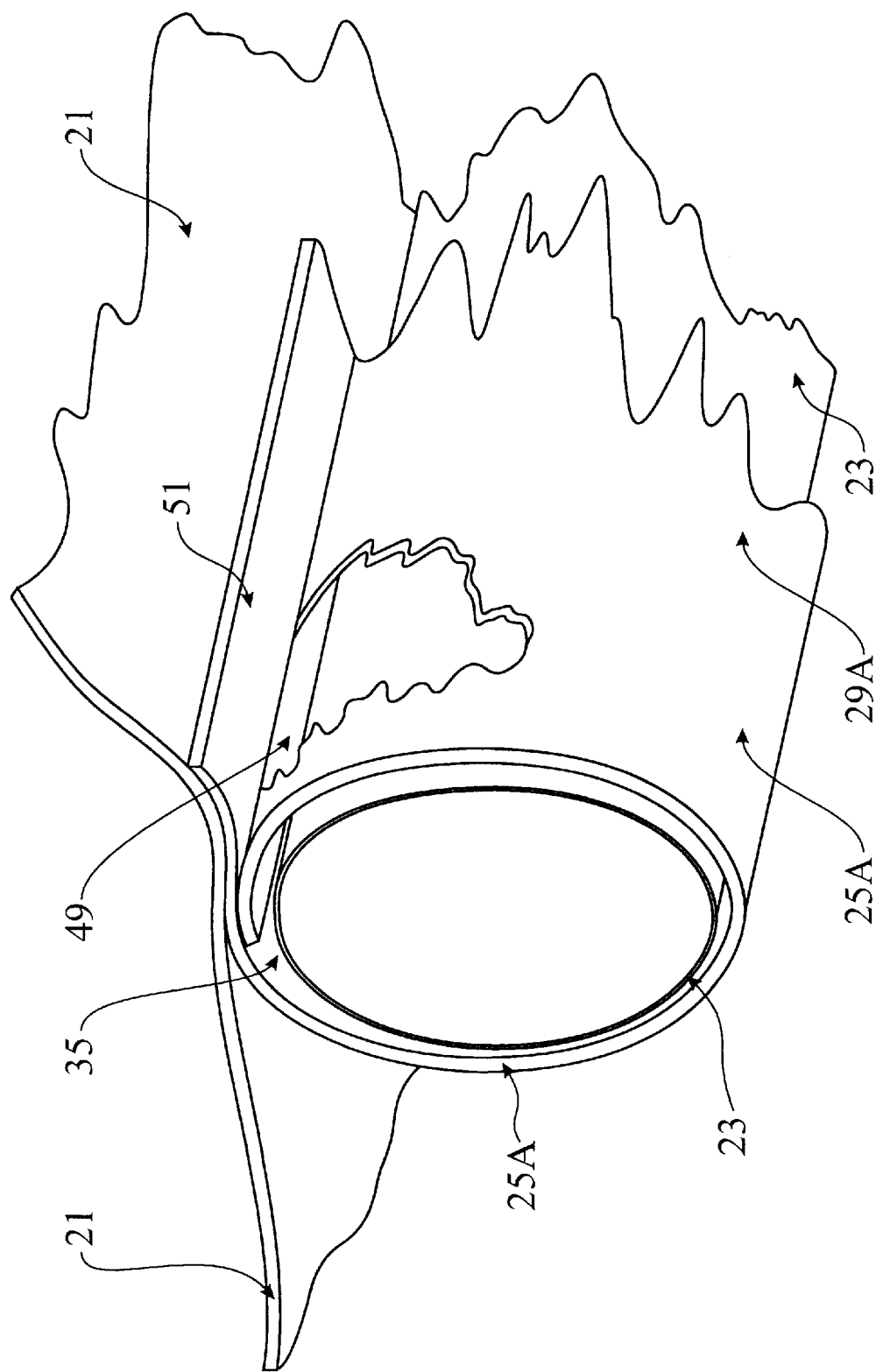
FIG. 3 is a close up isometric view of an inflatable tube, attached to the shell of the cover in accordance with a second embodiment.

In FIG. 3, there is shown the attachment tube 25A, in accordance with another embodiment. The casing formed by the attachment tube is different. The strip 29A of material is rolled to form an overlapping area 49. This overlapping area 49 is then stitched to close up the edge portions of the tube and form the interior cavity 35. A flap 51 extends from the tube, which flap is coupled to the shell as described above.

With the cover 13 assembled, installation on the vehicle is relatively easy. The cover is laid out on top 15 (see FIG. 1) of the vehicle 11 so as to drape down the vehicle sides 17. Straps 53 with hooks are stitched to the bottom edges of the shell. The hooks are hooked to various locations of the vehicle underbody. Typically, there are two front and two rear straps. The straps can be adjustable in length.

An air pump 55 is connected to the valve 27. The air pump is a conventional, commercially available device. Preferably, the pump is battery operated (such as the vehicle battery) and is a high volume, low pressure (5–10 psi) pump. The pump is activated, wherein the inflatable tube 23 inflates. As inflation progresses, the shell is pushed away from the vehicle surfaces by the inflatable tube. When fully inflated, the inflatable tube also provides a stiffener for the shell, which makes the shell more resistant to the weather.

When the tube 23 is satisfactorily inflated, the pump is deactivated. To prevent overinflation of the tube, a pressure relief valve can bleed air, or the pump can be shut off. After inflation, the pump is disconnected and stowed.

Figure 5:
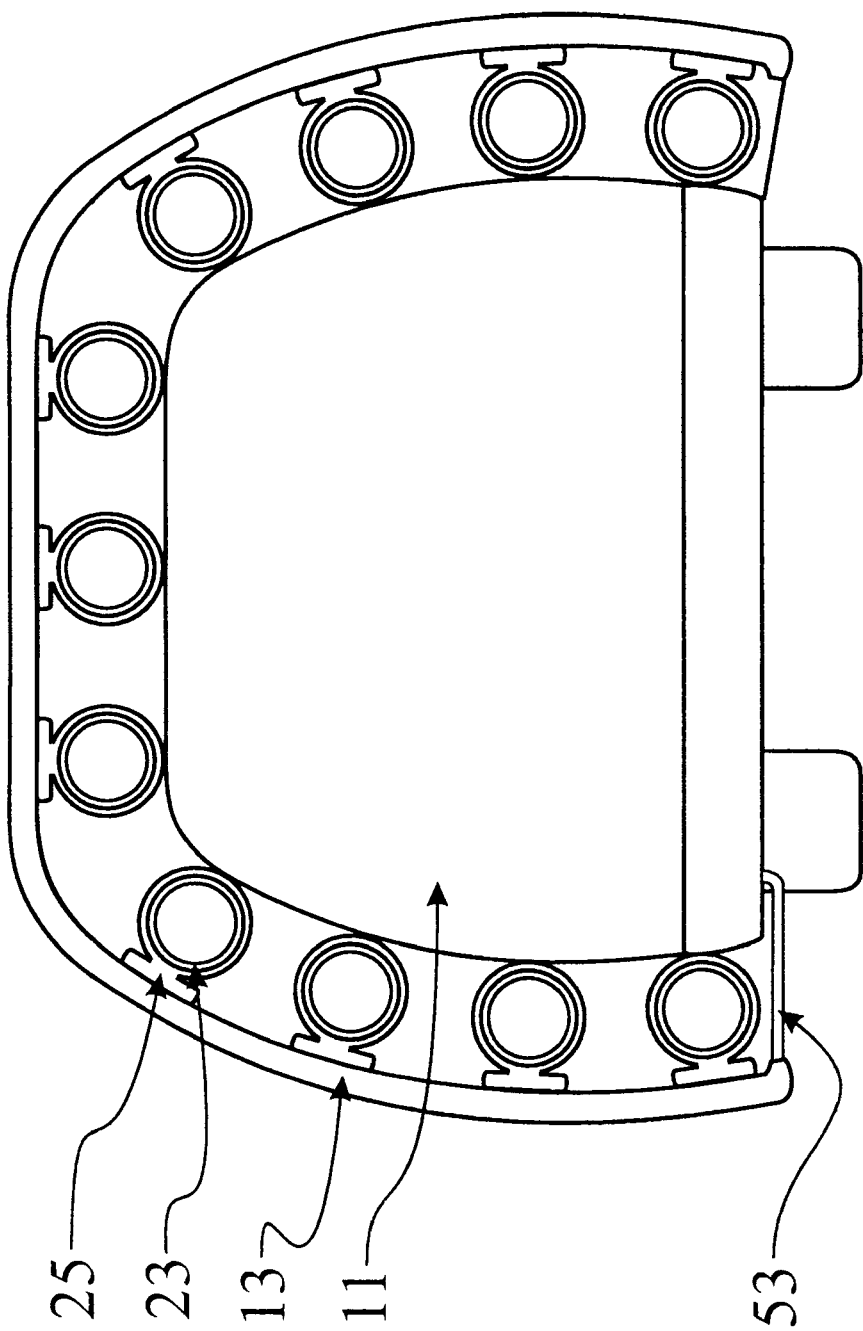
FIG. 5 is a schematic transverse cross-sectional view of the vehicle and the cover.

The vehicle is now protected from the weather. Should, for example, a hail storm arise, with pelting hail stones, the cover takes the brunt of the impact. Referring to FIG. 5, hail stones are prevented from directly striking the vehicle by the cover 13. Instead, the hail stones strike the shell either directly on a portion of the inflatable tube 23 or between two lengths of the inflatable tube. If a hail stone strikes the shell 21 directly on the inflatable tube 23, the inflatable tube will deform to absorb the impact. If a hail stone strikes the shell between two lengths of the inflatable tube, the two lengths of inflatable tube will deform to absorb the impact.

The distance between two lengths of the inflatable tube 23 can vary. For weight and size purposes, a minimum number of lengths of the inflatable tube 23 along the vehicle is desired. The gap 47 between two lengths preferably is greater than one half of the diameter of the inflatable tube, when fully inflated. The gap 47 can be even larger than the diameter of the inflatable tube. In fact, the gap can be larger than twice the diameter of the inflatable tube. The actual distance of the gap 47 also depends on the weight of the cover that is desired and the contours of the vehicle that is to be protected. Vehicles with large flat surfaces can utilize wider spacings between the inflation tube lengths. Surfaces that have comers would utilize closer spacings.

To remove the cover from the vehicle, the vacuum intake of the pump 55 is connected to the valve 27. The pump is activated, wherein the air inside of the inflatable tube is drawn out. Using a commercially available pump, the time to inflate and deflate the cover is only a few minutes. The pump is small, light weight and easy to stow.

Figure 6:
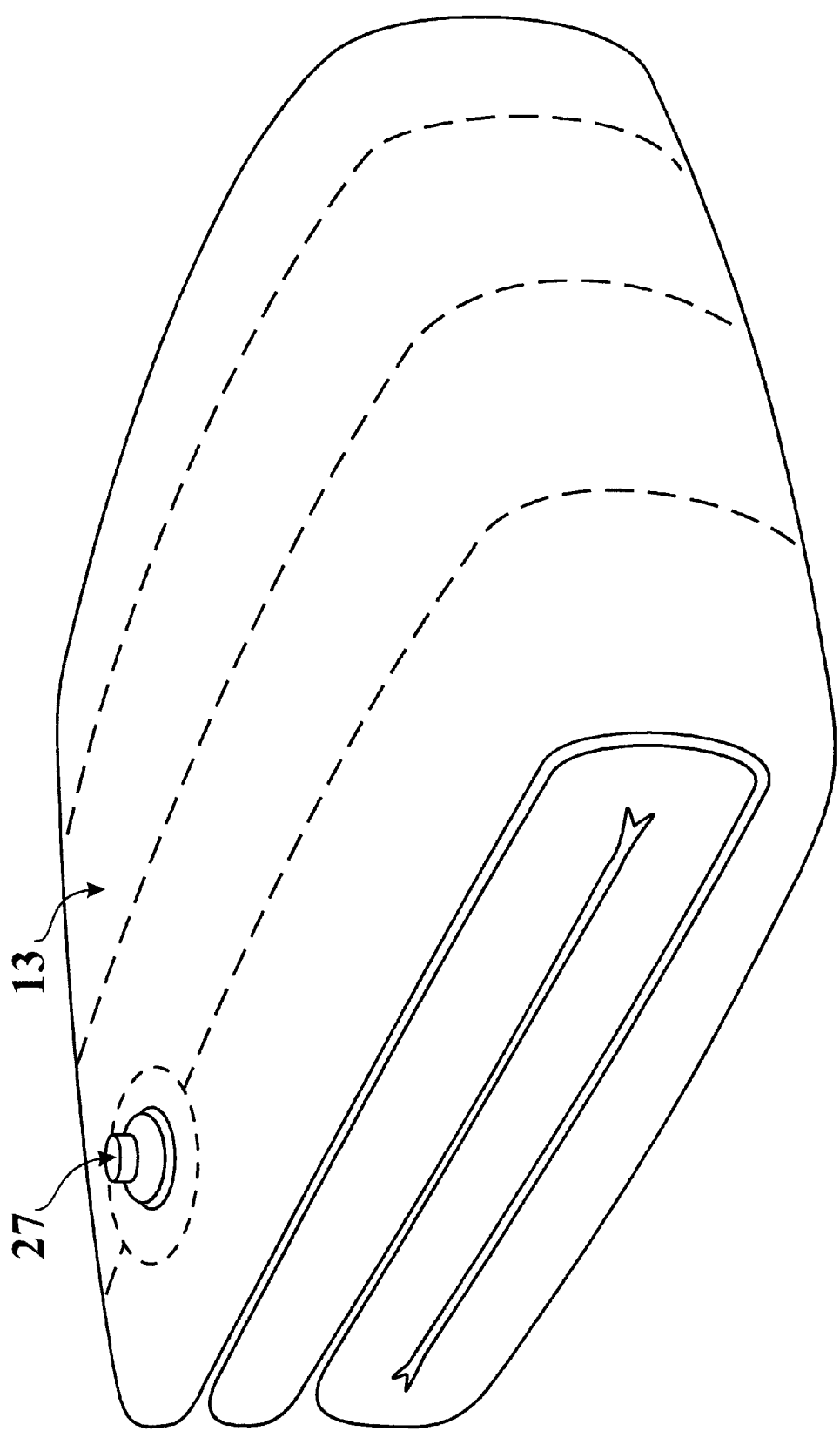
FIG. 6 is an isometric view of the cover, deflated and folded for storage.

After deflation, the cover 13 is folded up such as shown in FIG. 6, and stowed away. The folded cover can be stowed in the trunk of the vehicle.

The cover can be used without inflating the inflatable tube.

If the inflatable tube 23 should be punctured or otherwise leaks, it is merely pulled from the attachment tube 25. The inflatable tube can then either be repaired or replaced. The inflatable tube is inserted into the attachment tube as described above. Thus, the entire cover need not be replaced.

The attachment and inflatable tubes can be retrofitted onto existing shells.

The cover of the present invention can be used on a variety of vehicles such as automobiles, boats, motor homes, camper trailers, etc.

The foregoing disclosure and the showings made in the drawings are merely illustrative of the principles of this invention and are not to be interpreted in a limiting sense.

What is claimed is:

1. A vehicle protection system including a vehicle, the vehicle having a surface that can be damaged when exposed to weather, comprising:
    a) a flexible shell located over the surface of the vehicle, the shell being made of fabric;
    b) the shell being spaced from the surface by an inflatable tube;
    c) the inflatable tube being coupled to the shell by way of an attachment tube, the attachment tube being coupled to the shell and having an interior cavity that receives the inflatable tube, the attachment tube bearing on the vehicle surface.

2. The protection system of claim 1 wherein the attachment tube has plural lengths, with each length of the attachment tube extending adjacent to at least one other length of the attachment tube, the adjacent lengths of the attachment tube being separated from each other by gaps.

3. The protection system of claim 2 wherein the attachment tube has a diameter, the gap being greater than one half of the diameter.

4. The protection system of claim 2 wherein the plural lengths of the attachment tube are joined together to form a single attachment tube.

5. The protection system of claim 4 wherein the plural lengths of the attachment tube are arranged in a spiral on the shell.

6. The protection system of claim 1 wherein the attachment tube comprises a sheet having two opposite edge portions, the edge portions forming flaps, which flaps are coupled to the shell so as to form the attachment tube.

7. The protection system of claim 1 wherein the attachment tube comprises a sheet having two opposite edge portions, the edge portions overlapping so as to form the attachment tube, with one of the edge portions forming a flap being coupled to the shell.

\* \* \* \* \*